Patented Feb. 5, 1946

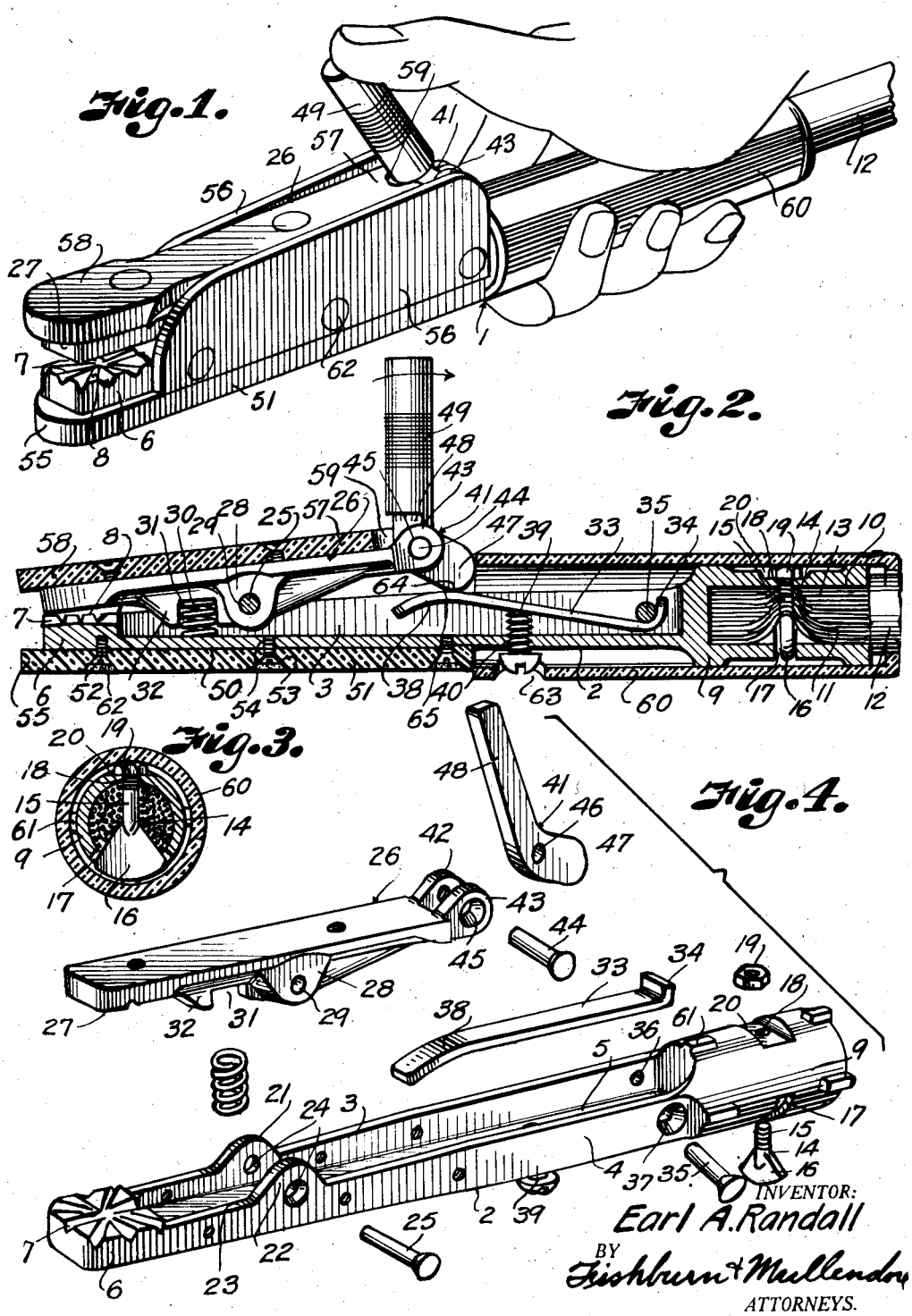

2,394,204

UNITED STATES PATENT OFFICE 2,394,204

ELECTRODE HOLDER

Earl A. Randall, Kansas City, Mo.

Application May 20, 1944, Serial No. 536,530

9 Claims. (Cl. 219—8)

This invention relates to an electrode holder adapted to grip an electrode rod used in electrical welding of metals and has for its principal object to provide a holder of this character having means for effecting a positive gripping action of the jaws thereof on an electrode rod and which is adapted to be operated with ease and very little effort on the part of the user.

Other objects of the invention are to provide an electrode holder which is of light weight and durable construction; to provide an electrode holder with an adjustable spring action on the jaws to accommodate the holder to different sized welding rods and to compensate for any wear in the operating parts; and to provide the electrode holder with a positive connection between the holder and the electrical conductor which supplies a welding current thereto.

In accomplishing these and other objects of the invention, I have provided improved structure, the preferred form of which is illustrated in the accompanying drawing wherein:

Fig. 1 is a perspective view of an electrode holder constructed in accordance with the present invention showing the jaws in open position.

Fig. 2 is a longitudinal section through the holder showing the jaws in clamping position.

Fig. 3 is a cross section through the handle portion of the holder, particularly illustrating connection of the electrical conductor which forms one side of an electrical circuit for supplying a welding current.

Fig. 4 is a detailed perspective view of the current conducting parts of the holder shown in disassembled, spaced relation to better illustrate the construction thereof.

Referring more in detail to the drawing:

1 designates an electrode holder constructed in accordance with the present invention and which includes a body member 2 of substantially channel-shaped cross section to provide side flanges 3 and 4 and a connecting web 5. Formed on one end thereof is a fixed jaw 6 having grooves 7 in the face 8 thereof which extend at a plurality of angles for mounting the end of an electrode rod (not shown) in a manner which is well understood by those skilled in the art of welding. The opposite end of the member 2 is provided with a socket 9 having a bore 10 opening from the end thereof to receive therein the terminal end 11 of an electrical conductor 12. The electrical conductor 12 is of the usual construction and consists of a plurality of strands 13 which are adapted to be wedged into electrical contact with the holder by a fastening device 14. The fastening device 14 includes a threaded shank 15 having a relatively flat, wing-shaped head 16 that is drawn through a lateral arcuate-shaped slot 17 in the socket when the threaded shank 15 is projected through an oppositely aligned opening 18. The fastening device also includes a nut 19 that is threaded on the shank 15 and which is retained in a recess 20 formed in the exterior of the socket as best shown in Figs. 2 and 4. The flanges 3 and 4 have ears 21 and 22 projecting from the edges 23 thereof at a point spaced from the fixed jaw 6 and which are provided with openings 24 for passing a pivot pin 25 for supporting a movable jaw member 26. The movable jaw member 26 has a jaw 27 at one end cooperating with the jaw 6 to retain the welding rod in one of the grooves 7. The member 26 has an ear 28 positioned between the ears 21 and 22 and having an opening 29 for accommodating the pivot pin 25. The jaw 27 is normally retained away from the jaw 6 by a coil spring 30 having one end seated on the web 5 of the member 2 at a point intermediate the jaw 6 and pivot pin 25 and its other end engaging in a notch-like seat 31 in a longitudinal rib 32 on the jaw member 26 as best shown in Figs. 2 and 3.

The jaws are selectively retained in gripping contact with an electrode against action of the spring 30 by a spring 33 supported in the space between the flanges 3 and 4. The spring 33 is of leaf type and has a hook 34 adjacent the socket 9 and engaging under a retaining pin 35 having the ends supported in suitable openings 36 and 37 in the flanges 3 and 4. The opposite end of the spring extends forwardly between the flanges 3 and 4 and is provided with a cam-engaging terminal 38 curving downwardly in the direction of the web 5. The curved end of the spring is adjustably cantilevered upon a set screw 39 that is threaded in an opening 40 of the web 5 intermediate the end of the movable jaw member 26 and the anchoring pin 35 whereby action of the spring is adjusted to accommodate the jaws to different sized welding rods and to take up play in the parts should wear occur therein.

The spring 33 is tensioned to retain the jaws in gripping engagement by a toggle-like lever 41 which is pivotally mounted between spaced ears 42 and 43 on the rear end of the jaw member 26, the lever being retained by a pivot pin 44 extending through registering openings 45 in the ears and through an opening 46 in the lever. The lever is of substantially bell crank shape and has a cam-like terminal 47 arranged to press against the curved end 38 of the spring as shown in Fig. 2. The other end of the lever forms a shank 48 for carrying an insulating sleeve 49 adapted to be engaged by the finger or thumb to effect actuation of the jaw as later described.

The underface 50 of the web 5 is provided with an insulating member 51 that is secured thereto by fastening devices 52 extending through suitable openings 53 therein and into threaded openings 54 in the web as shown in Fig. 2. The sides of the insulating member project outwardly from the flanges 3 and 4 and forwardly from the jaw 6 as indicated at 55. The outer sides of the flanges 3 and 4 are faced from a point adjacent the rear end of the jaw member 26 with insulator 56 and which is of sufficient height to extend above the movable jaw member 26 and cooperate with similar insulator 57 thereon. The insulator 57 has the rear portion of suitable width to be received between the side plates 55, and the forward end 58 thereof has a shape corresponding to the shape of the forward end of the lower insulating plate as shown in Fig. 1. The rear end of the insulator 57 is bifurcated as at 59 to accommodate the operating lever as shown in Fig. 2. The rear end of the body member 2 including the socket 9 is provided with an insulating sleeve 60 which also forms a handle by which the tool is supported in the hand of the welder as shown in Fig. 1, the sleeve 60 being spaced from the socket 9 by ribs 61 to provide air passageways for keeping the hand cool. The sleeve-like handle has an opening 63 therein registering with the head of the adjusting screw 40 so that the spring 33 may be moved into contact with the cam end of the actuating lever when the lever is in retracted position and the jaws held apart by the spring 30.

In assembling the parts, the hooked end 34 of the spring 33 is engaged under the pin 35 so that the forward end cantilevers over the adjusting screw 39. The spring 30 is then seated in the recess 31 of the movable jaw member and the movable jaw member is connected with the member 2 by the pivot pin 25 which is passed through the registering openings 24 and 29. The operating lever is inserted between the ears 42 and 43 and pivotally retained by passing the pivot pin 44 through the openings 45 and 46. The insulators including the sleeve-like handle are then applied and secured by the fastening devices 52 which have the heads thereof countersunk in the insulating material below the outer surface thereof to accommodate insulating plugs 62.

With the actuating lever in a forward position as shown in Fig. 1, spring 33 is relatively free of tension. However, when the actuating lever is moved retractively in the direction of the arrow (Fig. 2) the spring is loaded to exert pressure on the gripping jaws. The high lobe portion 64 of the cam passes over the apex 65 of the curved end of the spring and the lever is locked in position to retain the jaws in gripping contact (Fig. 2). The jaws may be readily released by flipping the lever in the opposite direction as shown in Fig. 1.

The electrical conductor is connected with the electrode holder by passing the end thereof into the socket and pushing the shank 15 of the fastening device through the arcuate opening in the socket and between the strands of the conductor as shown in Fig. 3 so that the end thereof projects sufficiently to apply the nut 19, after which the nut may be tightened to cause the wing-shaped head to draw the strands into wedging contact with the wall of the socket thereby providing a positive contact and assuring retention of the conductor within the socket of the electrode holder.

From the foregoing it is obvious that I have provided an electrode holder that is of simple and inexpensive construction and which is adapted to positively grip an electrode rod when it is inserted between the jaws.

It is also obvious that I have provided an electrode holder that is readily operated to cause movement of the jaw into gripping engagement with the rod in an easy and simple manner with little effort on the part of the user.

What I claim and desire to secure by Letters Patent is:

1. A device of the character described including a pair of jaws, one movable relative to the other for gripping an electrode rod therebetween, a spring arranged to move said jaws apart, a second spring arranged to move the jaws into gripping engagement, means for selectively loading the last-named spring, and means for adjusting the action of the selectively loaded spring.

2. A device of the character described including a body member, a fixed jaw on the body member, a movable jaw on the body member to cooperate with the fixed jaw for gripping an electrode rod therebetween, a spring between said jaws for retaining the movable jaw out of gripping position relative to the fixed jaw, a leaf spring carried by the body member, and means on the movable jaw engaging the leaf spring to load said leaf spring for moving the jaws into gripping relation.

3. A device of the character described including a body member, a fixed jaw on the body member, a movable jaw on the body member to cooperate with the fixed jaw for gripping an electrode rod therebetween, a spring between said jaws for retaining the movable jaw out of gripping position relative to the fixed jaw, a leaf spring carried by the body member, and an actuating lever pivotally mounted on the movable jaw and having a cam portion engaging the leaf spring to load said leaf spring for moving the jaws into gripping relation.

4. A device of the character described including a channel-shaped body member, a fixed jaw at one end of the body member, a socket at the other end of the body member, a movable jaw, means pivotally mounting the movable jaw intermediate the flanges of the body member, a leaf spring having one end anchored in the body member, a set screw threaded into the body member and engaging the leaf spring, and an actuating lever carried by the movable jaw and having a cam portion for tensioning the leaf spring to hold the jaws in gripping contact with an electrode rod.

5. A device of the character described including a channel-shaped body member, a fixed jaw at one end of the body member, a socket at the other end of the body member, a movable jaw, means pivotally mounting the movable jaw intermediate the flanges of the body member, a pin extending transversely of the flanges, a leaf spring having a hooked end engaging said pin, a set screw threaded into the body member and engaging the opposite side of the leaf spring relative to the pin, and an actuating lever carried by the movable jaw and having a cam portion for tensioning the leaf spring to hold the jaws in gripping contact with an electrode rod.

6. A device of the character described including a body member, a fixed jaw on the body member, a movable jaw on the body member to cooperate with the fixed jaw for gripping an electrode rod therebetween, a leaf spring carried by the body member, an actuating lever pivotally mounted on the movable jaw and having a cam portion engaging the leaf spring to load said leaf spring for moving the jaws into gripping relation, and means carried by the body member for adjusting the action of the leaf spring when loaded by said actuating lever.

7. An electrode holder including a body member, a fixed jaw at one end of said body member, an adjusting member carried by the body member, a leaf spring having an end anchored in the body member and the other cantilevered over said adjusting member, a jaw member pivotally connected with said body member and having a jaw cooperating with the first-named jaw, and an actuating lever pivoted on the jaw member and having a cam portion engaging with the cantilevered portion of said spring for pivoting the jaw member into gripping engagement relative to the fixed jaw upon operation of the operating lever and to load said spring.

8. An electrode holder including a body member having a channel portion, a pin extending transversely of the channel portion, a fixed jaw at the opposite end of said channel portion, an adjusting member carried by the channel portion intermediate the pin and jaw, a leaf spring having an end engaging the pin and having a portion cantilevered over said adjusting member, a jaw member pivotally connected with said channel portion and having a jaw cooperating with the first-named jaw, and an actuating lever pivoted on the jaw member and having a cam portion engaging the cantilevered portion of said spring for pivoting the jaw member into gripping engagement relative to the fixed jaw upon actuation of the operating lever.

9. An electrode holder including a body member having a channel portion, a pin extending transversely of the channel portion, a fixed jaw at the opposite end of said channel portion and an adjusting member carried by the channel portion intermediate the pin and jaw, a leaf spring having an end engaging the pin and having a portion cantilevered over said adjusting member, a jaw member pivotally connected with said channel portion and having a jaw cooperating with the first-named jaw, an actuating lever pivoted on the jaw member and having a cam portion engaging with the cantilevered portion of said spring for effecting gripping engagement of the jaws upon operation of the operating lever, and a spring normally urging the jaws apart.

EARL A. RANDALL.